United States Patent
Kume et al.

(10) Patent No.: US 12,503,902 B2
(45) Date of Patent: Dec. 23, 2025

(54) VEHICLE DOOR DEVICE

(71) Applicant: AISIN CORPORATION, Kariya (JP)

(72) Inventors: Sho Kume, Kariya (JP); Yusuke Kajino, Kariya (JP)

(73) Assignee: AISIN CORPORATION, Kariya (JP)

( * ) Notice: Subject to any disclaimer, the term of this patent is extended or adjusted under 35 U.S.C. 154(b) by 420 days.

(21) Appl. No.: 18/058,319

(22) Filed: Nov. 23, 2022

(65) Prior Publication Data

US 2023/0212903 A1    Jul. 6, 2023

(30) Foreign Application Priority Data

Jan. 6, 2022   (JP) .................. 2022-001218

(51) Int. Cl.
    *E05F 15/649*      (2015.01)
    *B60J 5/04*      (2006.01)

(52) U.S. Cl.
    CPC ........... *E05F 15/649* (2015.01); *B60J 5/0479* (2013.01); *E05Y 2800/678* (2013.01); *E05Y 2900/531* (2013.01)

(58) Field of Classification Search
    CPC ... B60J 5/04; B60J 5/047; B60J 5/0477; B60J 5/0479; B60J 5/06; B60J 2005/0475; E05Y 2900/531; E05F 15/649; E05D 15/101; E05D 3/16
    USPC .................. 296/146.1, 146.9, 146.11, 146.12
    See application file for complete search history.

(56) References Cited

U.S. PATENT DOCUMENTS

| | | | | |
|---|---|---|---|---|
| 6,305,737 B1 * | 10/2001 | Corder | .................... | E05F 15/63 |
| | | | | 296/146.12 |
| 6,793,268 B1 * | 9/2004 | Faubert | ...................... | B60J 5/06 |
| | | | | 296/146.12 |
| 10,876,341 B2 * | 12/2020 | Taylor | ..................... | E05F 15/41 |
| 11,377,192 B2 * | 7/2022 | Heeren | ................... | E05D 15/32 |
| 12,196,022 B2 * | 1/2025 | Kajino | ................. | E05D 7/0009 |
| 2022/0205293 A1 * | 6/2022 | Sumiya | ................. | E05D 15/101 |
| 2022/0297514 A1 * | 9/2022 | Yamaguchi | .............. | B60J 5/047 |
| 2023/0212896 A1 * | 7/2023 | Yun | ........................... | E05F 5/00 |
| | | | | 49/381 |

FOREIGN PATENT DOCUMENTS

| | | | | |
|---|---|---|---|---|
| CN | 116653808 A | * | 8/2023 | ............. B60J 5/047 |
| JP | 2006-90097 A | | 4/2006 | |
| JP | 2016215957 A | * | 12/2016 | |

* cited by examiner

*Primary Examiner* — Amy R Weisberg
*Assistant Examiner* — Denise Lynne Esquivel
(74) *Attorney, Agent, or Firm* — Oblon, McClelland, Maier & Neustadt, L.L.P.

(57) ABSTRACT

A vehicle door device includes a first link arm and a second link arm each having a first pivot coupling point with respect to a vehicle body and a second pivot coupling point with respect to a door of a vehicle, and a biasing force applying device configured to, during opening and closing operation of the door based on an operation of a link mechanism formed by the first link arm and the second link arm, apply, to the door, a biasing force in a direction in which a rotational moment around the second pivot coupling point generated based on inertia of the door generated in the door accompanied by the operation of the link mechanism is reduced.

10 Claims, 9 Drawing Sheets

SHORTENED STATE

FIG. 6

EXTENDED STATE: P0

VEHICLE DOOR DEVICE

CROSS REFERENCE TO RELATED APPLICATIONS

This application is based on and claims priority under 35 U.S.C. § 119 to Japanese Patent Application 2022-001218, filed on Jan. 6, 2022, the entire content of which is incorporated herein by reference.

TECHNICAL FIELD

This disclosure relates to a vehicle door device.

BACKGROUND DISCUSSION

In the related art, there is a vehicle door device including first and second link arms having a first pivot coupling point with respect to a vehicle body and a second pivot coupling point with respect to a door of a vehicle. In such a vehicle door device, a door provided at a door opening portion thereof is opened and closed based on an operation of a link mechanism formed by the first and second link arms. For example, JP 2006-90097A discloses a configuration in which each link arm forming the link mechanism is stored outside a door opening attached to a terminal portion of a vehicle body side portion and inside a weather strip attached to a vehicle inner side of the door when the door is in a closed state.

However, in the configuration in which the door of the vehicle is opened and closed using the link mechanism as described above, the door is allowed to pivot around the second pivot coupling point. Accordingly, there is a possibility that the door swings.

SUMMARY

According to an aspect of this disclosure, a vehicle door device includes: a first link arm and a second link arm each having a first pivot coupling point with respect to a vehicle body and a second pivot coupling point with respect to a door of a vehicle; and a biasing force applying device configured to, during opening and closing operation of the door based on an operation of a link mechanism formed by the first link arm and the second link arm, apply, to the door, a biasing force in a direction in which a rotational moment around the second pivot coupling point generated based on inertia of the door generated in the door accompanied by the operation of the link mechanism is restricted.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a vehicle door device will be described with reference to the drawings.

As shown in FIGS. 1 to 4, a vehicle 1 according to the present embodiment includes a door opening portion 3 provided in a side surface 2s of a vehicle body 2. In the vehicle 1 according to the present embodiment, the door opening portion 3 does not have a pillar structure at a central portion in a vehicle front-rear direction (a left-right direction in each drawing), and has a so-called pillarless structure in which a front opening portion 4 and a rear opening portion 5 are integrated. In addition, the vehicle 1 according to the present embodiment includes a pair of doors 10, 10 provided in the door opening portion 3. In the vehicle 1 according to the present embodiment, the doors 10, 10 are provided side by side in the vehicle front-rear direction, that is, in an opening width direction of the door opening portion 3. Further, the doors 10, 10 are supported by the vehicle body 2 via link mechanisms 20, 20 provided independently, respectively. Accordingly, in the vehicle 1 according to the present embodiment, a vehicle door device 30 capable of independently opening and closing the pair of doors 10, 10 provided in the door opening portion 3 in opposite directions based on an operation of each of the link mechanisms 20, 20 is formed.

That is, in the vehicle 1 according to the present embodiment, the door 10 disposed in the front opening portion 4 constituting a front portion (a left side in each drawing) of the door opening portion 3 constitutes a front door 31 of the vehicle 1. In addition, the door 10 disposed in the rear opening portion 5 constituting a rear portion (a right side in each drawing) of the door opening portion 3 constitutes a rear door 32 of the vehicle 1. Further, in the vehicle door device 30 according to the present embodiment, the front door 31 is used as a first door 41, and the link mechanism 20 supporting the first door 41 constitutes a first link mechanism 51. The rear door 32 is used as a second door 42, and the link mechanism 20 supporting the second door 42 constitutes a second link mechanism 52.

Specifically, in the vehicle door device 30 according to the present embodiment, the link mechanisms 20, 20 each include a first link arm 61 and a second link arm 62 that are independent of each other. Further, the first link arm 61 and the second link arm 62 each have a first pivot coupling point X1 with respect to the vehicle body 2 and a second pivot coupling point X2 with respect to the door 10 of the vehicle 1. Accordingly, in the vehicle door device 30 according to the present embodiment, the link mechanisms 20, 20 constituting the first and second link mechanisms 51, 52 each have a configuration as a four-bar link mechanism independent of each other.

Specifically, a first link arm 71 and a second link arm 72 forming the first link mechanism 51 each have the first pivot coupling point X1 pivotally coupled to the vehicle body 2 in the vicinity of a front edge portion 3f of the door opening portion 3. In addition, the first link arm 71 and the second link arm 72 each have the second pivot coupling point X2 pivotally coupled to the first door 41 constituting the front door 31 of the vehicle 1. Further, a first link arm 81 and a second link arm 82 forming the second link mechanism 52 each have the first pivot coupling point X1 pivotally coupled to the vehicle body 2 in the vicinity of a rear edge portion 3r of the door opening portion 3. The first link arm 81 and the second link arm 82 each have the second pivot coupling point X2 pivotally coupled to the second door 42 constituting the rear door 32 of the vehicle 1.

In addition, in the first and second link mechanisms 51, 52, the first link arms 71, 81 are disposed above the second link arms 72, 82 with which the first link arms 71, 81 are paired, respectively. Specifically, the first link arms 71, 81 are respectively disposed at positions with a height below window portions 91, 92 of the vehicle 1 where the front door 31 and the rear door 32 are formed, and near a so-called belt line. The second link arms 72, 82 are respectively disposed at positions with a height in the vicinity of lower end portions 31b, 32b of the front door 31 and the rear door 32.

That is, in the vehicle door device 30 according to the present embodiment, the first link arms 71, 81 each have the second pivot coupling point X2 at positions closer to gravity centers of the front door 31 and the rear door 32 with respect to the second link arms 72, 82, respectively. Accordingly, the vehicle door device 30 according to the present embodiment has a configuration in which, in any one of the first and second link mechanisms 51, 52, the first link arms 71, 81 support a larger door load than the second link arms 72, 82.

Specifically, in the vehicle door device 30 according to the present embodiment, each of the second link arms 72, 82 positioned as a sub-link 94 is formed using one shaft-shaped member. On the other hand, each of the first link arms 71, 81 positioned as a main link 95 is formed by coupling two parallel shaft-shaped members. Accordingly, the vehicle door device 30 according to the present embodiment has a configuration of imparting high support rigidity to each of the first link arms 71, 81.

Figure 1:
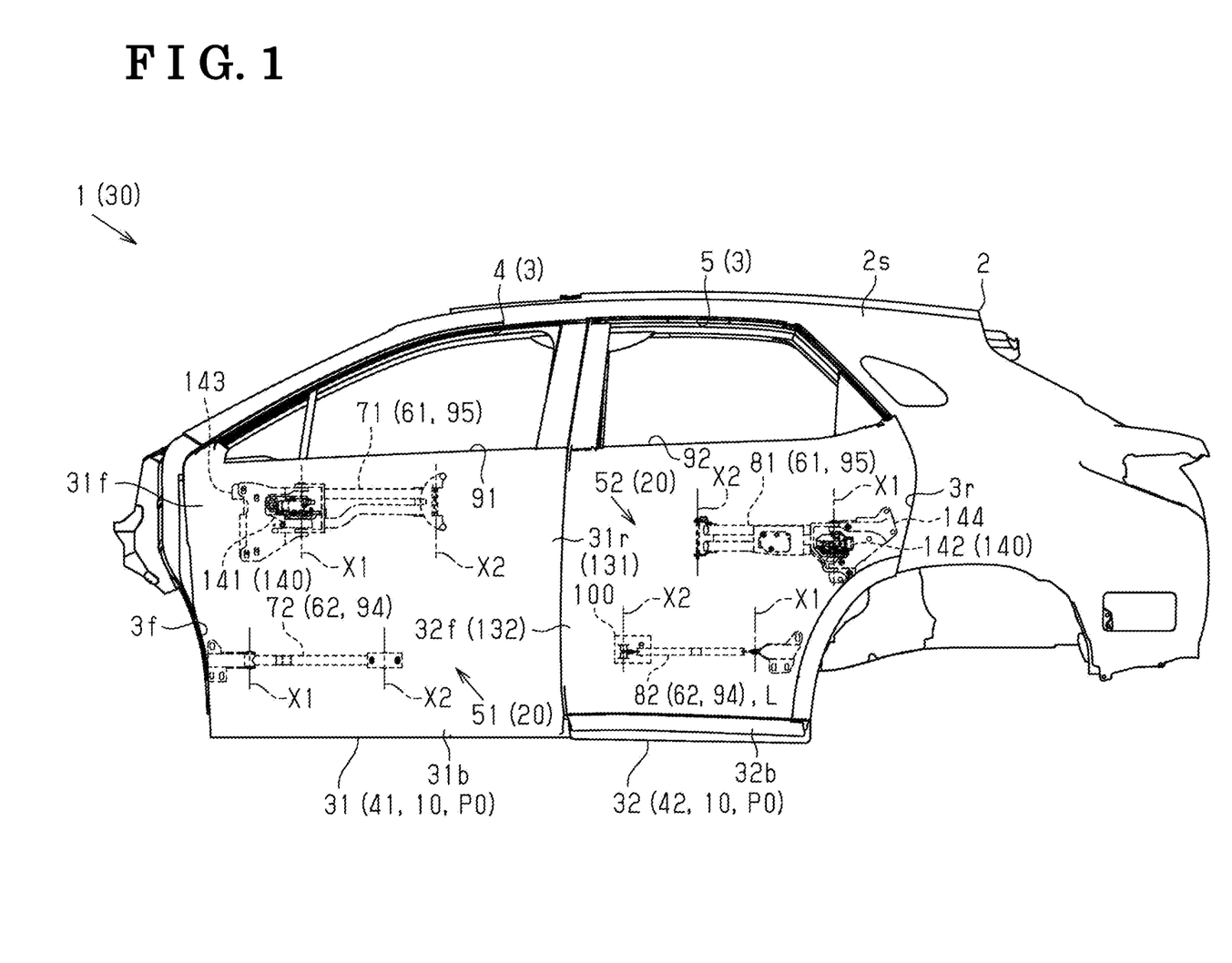
FIG. 1 is a front view of a front door and a rear door that are provided at a door opening portion of a vehicle.
Figure 2:
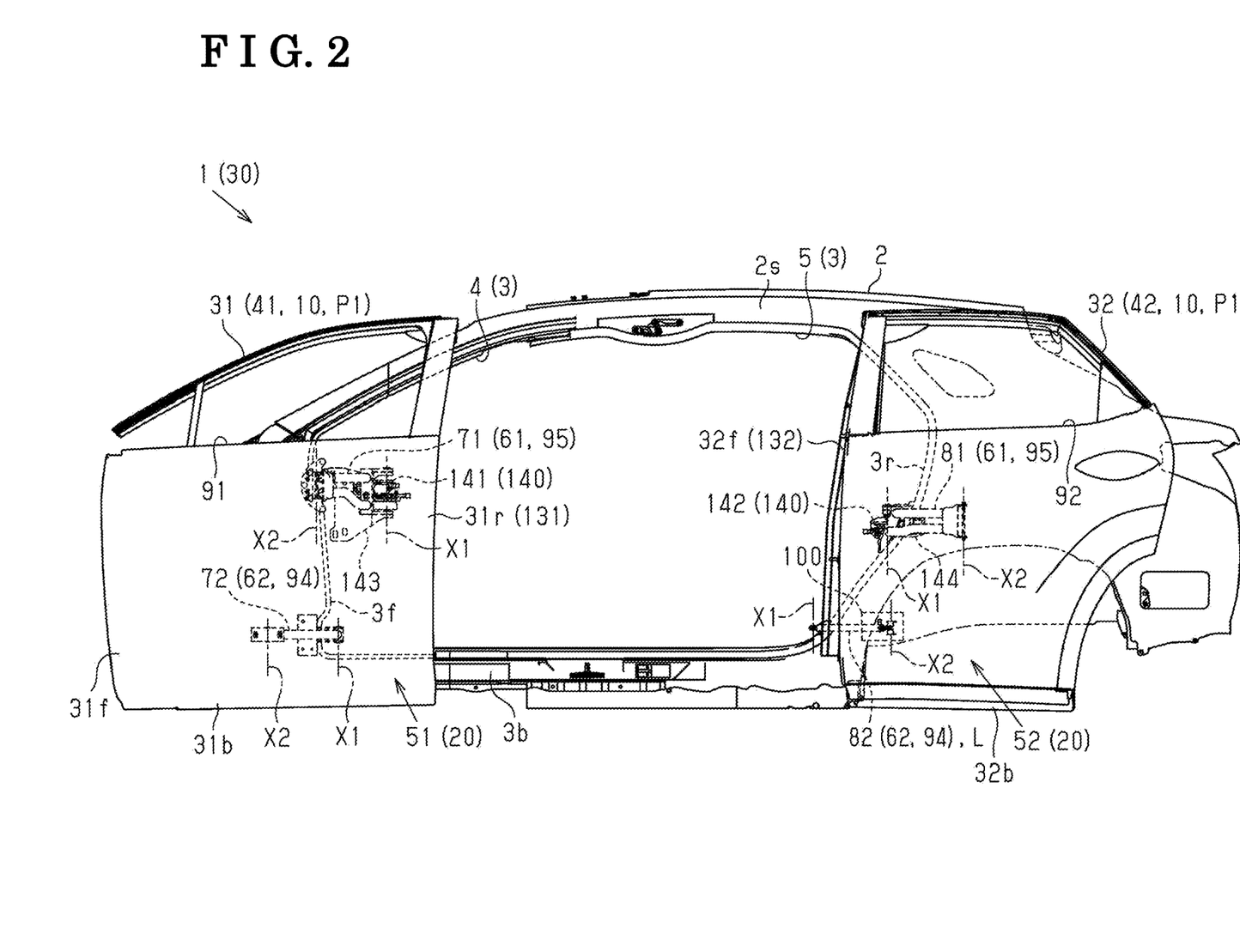
FIG. 2 is a front view of the front door and the rear door that are provided at the door opening portion of the vehicle.
Figure 3:
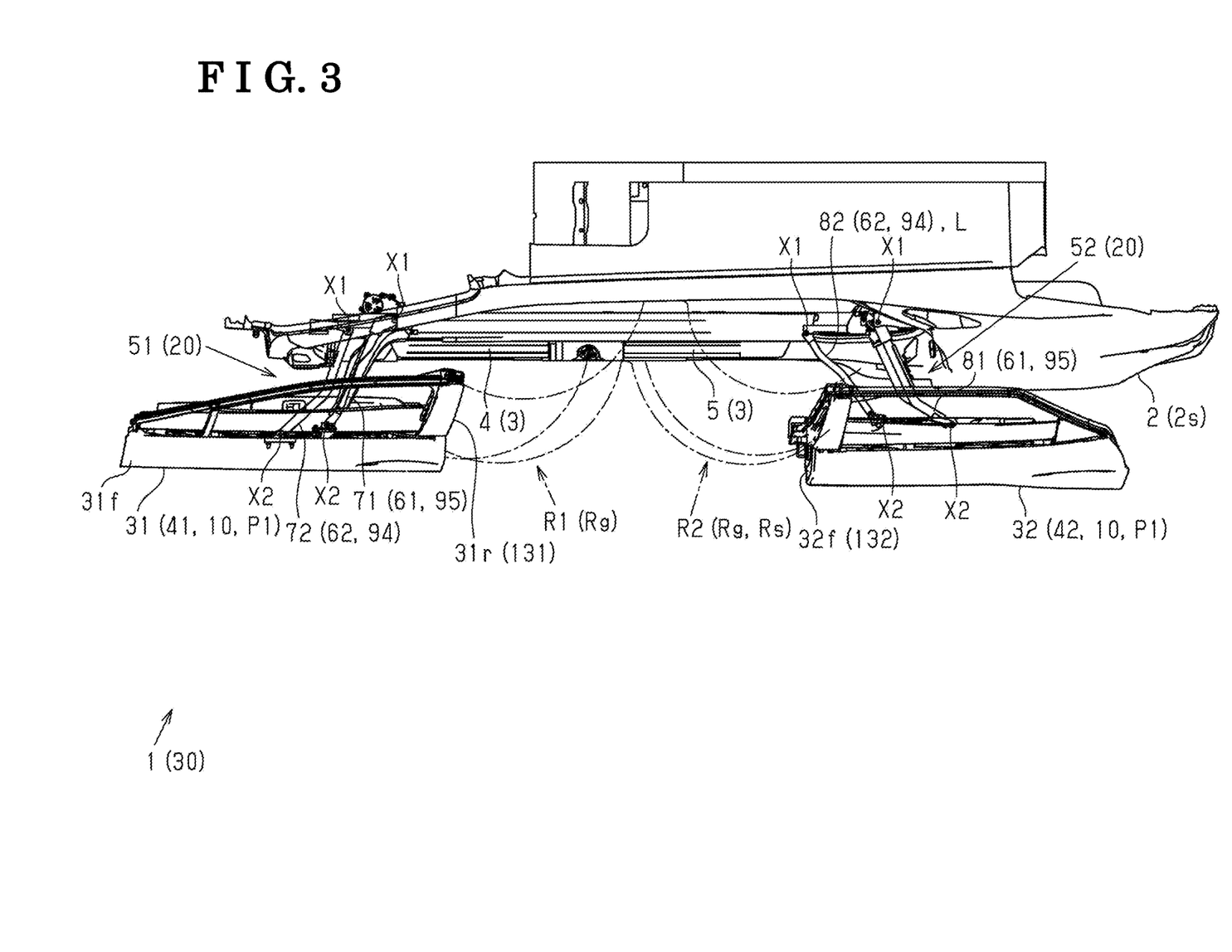
FIG. 3 is a top view of a door device that opens and closes the front door and the rear door of the vehicle.

More specifically, as shown in FIG. 3, in the vehicle door device 30 according to the present embodiment, during opening operation of the front door 31, the first and second link arms 71, 72 of the first link mechanism 51 pivot around the first pivot coupling points X1 in a clockwise direction in FIG. 3, respectively. Accordingly, in the vehicle door device 30 according to the present embodiment, the front door 31 supported by the first and second link arms 71, 72 is opened toward a front side of the vehicle.

In addition, in the vehicle door device 30 according to the present embodiment, during closing operation of the front door 31, the first and second link arms 71, 72 pivot around the first pivot coupling points X1 in a counterclockwise direction in FIG. 3, respectively. Accordingly, in the vehicle door device 30 according to the present embodiment, the front door 31 supported by the first and second link arms 71, 72 is closed toward a rear side of the vehicle.

On the other hand, in the vehicle door device 30 according to the present embodiment, during opening operation of the rear door 32, the first and second link arms 81, 82 of the second link mechanism 52 pivot around the first pivot coupling points X1 in the counterclockwise direction in FIG. 3, respectively. Accordingly, in the vehicle door device 30 according to the present embodiment, the rear door 32 supported by the first and second link arms 81, 82 is opened toward the rear side of the vehicle.

Further, in the vehicle door device 30 according to the present embodiment, during closing operation of the rear door 32, the first and second link arms 81, 82 pivot around the first pivot coupling points X1 in the clockwise direction in FIG. 3, respectively. Accordingly, in the vehicle door device 30 according to the present embodiment, the rear door 32 supported by the first and second link arms 81, 82 is closed toward the front side of the vehicle.

That is, in the vehicle door device 30 according to the present embodiment, based on the operations of the first link mechanism 51 formed by the first and second link arms 71, 72, an opening and closing trajectory R1 of the front door 31 is defined to draw an arc-shaped trajectory Rg. Similarly, based on the operations of the second link mechanism 52 formed by the first and second link arms 81, 82, an opening and closing trajectory R2 of the rear door 32 is defined to draw the arc-shaped trajectory Rg.

That is, in the vehicle door device 30 according to the present embodiment, when the doors 10, 10 supported by the link mechanisms 20, 20 approach a fully closed position P0, the first and second link arms 61, 62 extend in the vehicle front-rear direction. Accordingly, movement components in a vehicle width direction of the doors 10, 10 constituting the front door 31 and the rear door 32 of the vehicle 1 are increased.

In addition, at an intermediate opening and closing position where the first and second link arms 61, 62 forming the link mechanisms 20, 20 extend in the vehicle width direction, the movement components in the vehicle front-rear direction of the doors 10, 10 are increased. Accordingly, the vehicle door device 30 according to the present embodiment has a configuration in which, when the front door 31 and the rear door 32 of the vehicle 1 are opened and closed, a displacement amount in the vehicle width direction is restricted, thereby avoiding interference with an obstacle and securing a larger door opening amount.

Figure 4:
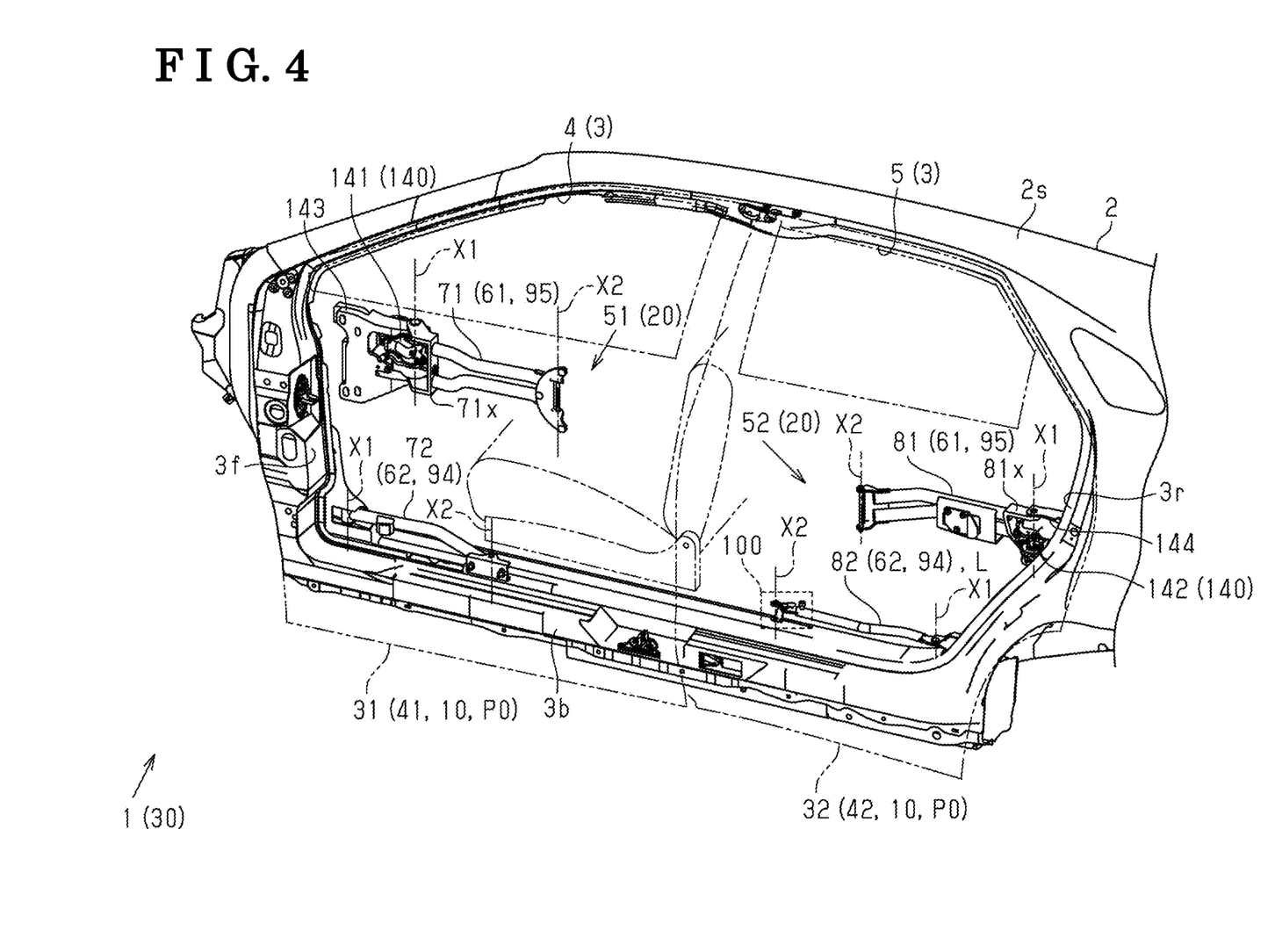
FIG. 4 is a perspective view of the door device that opens and closes the front door and the rear door of the vehicle.
Figure 5:
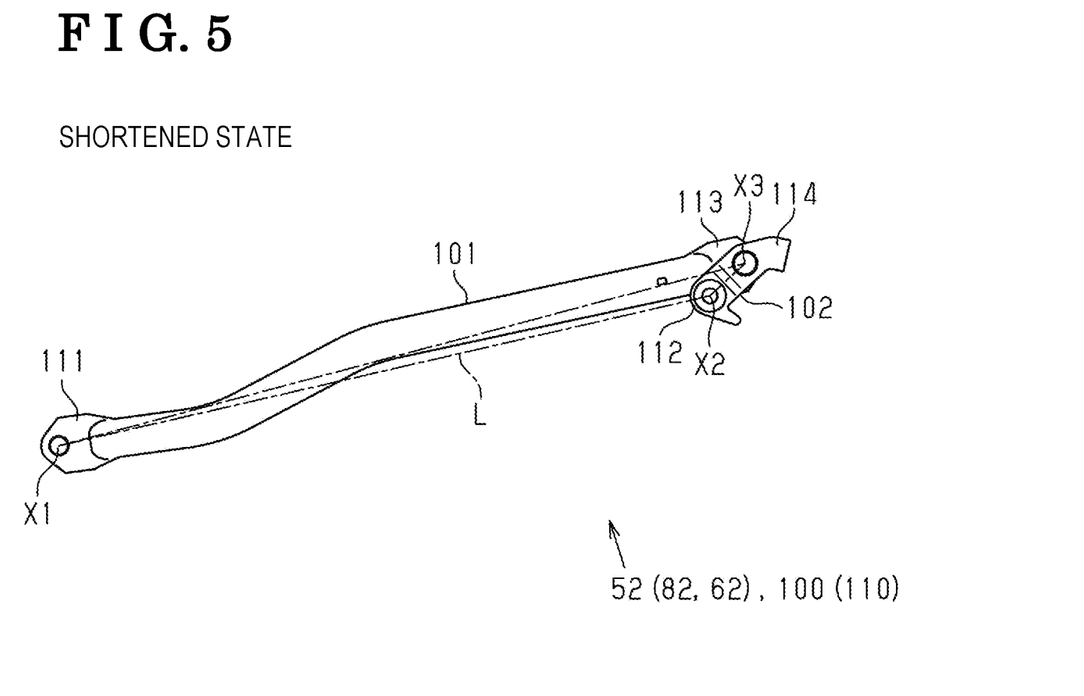
FIG. 5 is a plan view of a joint link mechanism constituting a coupling length variable mechanism.
Figure 6:
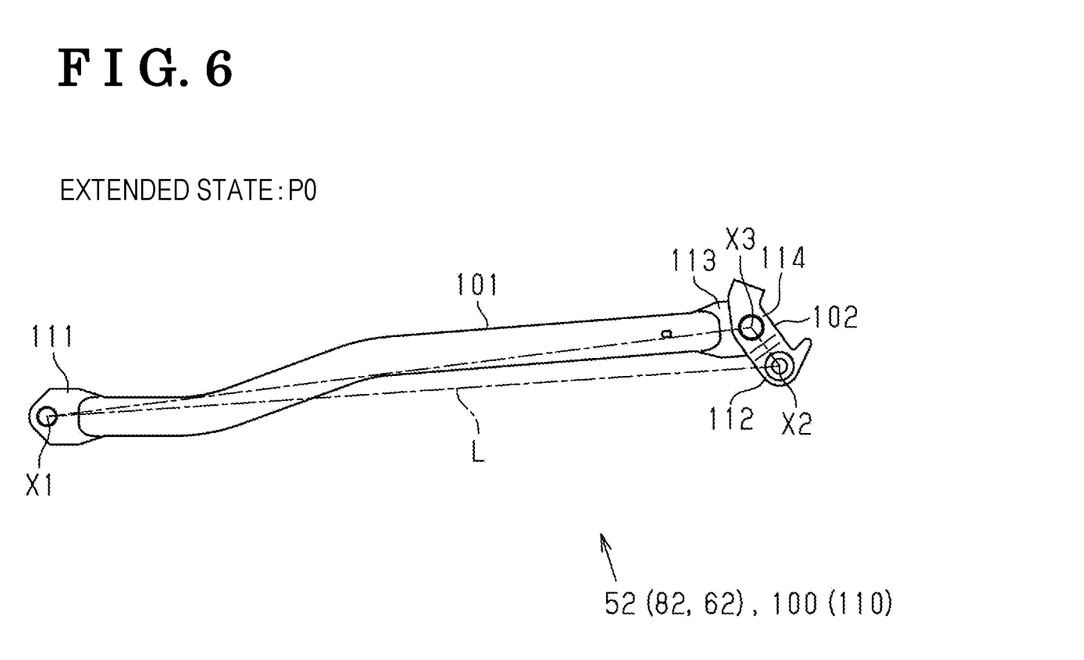
FIG. 6 is a plan view of the joint link mechanism constituting the coupling length variable mechanism.

In addition, as shown in FIGS. 4 to 6, in the vehicle door device 30 according to the present embodiment, the second link mechanism 52 supporting the rear door 32 includes a coupling length variable mechanism 100 provided in the second link arm 82. Further, in the vehicle door device 30 according to the present embodiment, a coupling length L between the first and second pivot coupling points X1, X2 of the second link arm 82 on a second link mechanism 52 side can be changed based on an operation of the coupling length variable mechanism 100.

Specifically, as shown in FIGS. 5 and 6, in the vehicle door device 30 according to the present embodiment, the second link arm 82 on the second link mechanism 52 side includes a vehicle body side link 101 and a door side link 102. That is, the vehicle body side link 101 has the first pivot coupling point X1 with respect to the vehicle body 2. In addition, the door side link 102 has the second pivot coupling point X2 with respect to the rear door 32 of the vehicle 1. Further, the second link arm 82 on the second link mechanism 52 side has a configuration in which the vehicle body side link 101 and the door side link 102 are pivotally coupled to each other. In the vehicle door device 30 according to the present embodiment, a joint link mechanism 110 formed as above functions as the coupling length variable mechanism 100.

Specifically, the door side link 102 according to the present embodiment has a configuration as a so-called mini-arm whose axial length is shorter than that of the vehicle body side link 101. In addition, the vehicle body side link 101 includes a vehicle body side coupling portion 111 with respect to the vehicle body 2 on one end side of the vehicle body side link 101 in a longitudinal direction. Further, the door side link 102 also includes a door side coupling portion 112 with respect to the door 10 on one end side of the door side link 102 in the longitudinal direction. The vehicle body side link 101 and the door side link 102 have intermediate coupling portions 113, 114 coupled to each other on the other end sides in the longitudinal direction, respectively.

That is, in the vehicle door device 30 according to the present embodiment, the intermediate coupling portions 113, 114 form an intermediate coupling point X3 of the joint link mechanism 110 provided in the second link arm 82 on the second link mechanism 52 side. In addition, in the second link arm 82, the vehicle body side link 101 and the door side link 102 form a triangle using the intermediate coupling point X3 as a vertex. Accordingly, the vehicle body side link 101 and the door side link 102 pivot relative to each other, and a length of a straight line coupling the first and second pivot coupling points X1, X2 serving as a base of the above triangle, that is, the coupling length L of the straight line changes.

Figure 7:
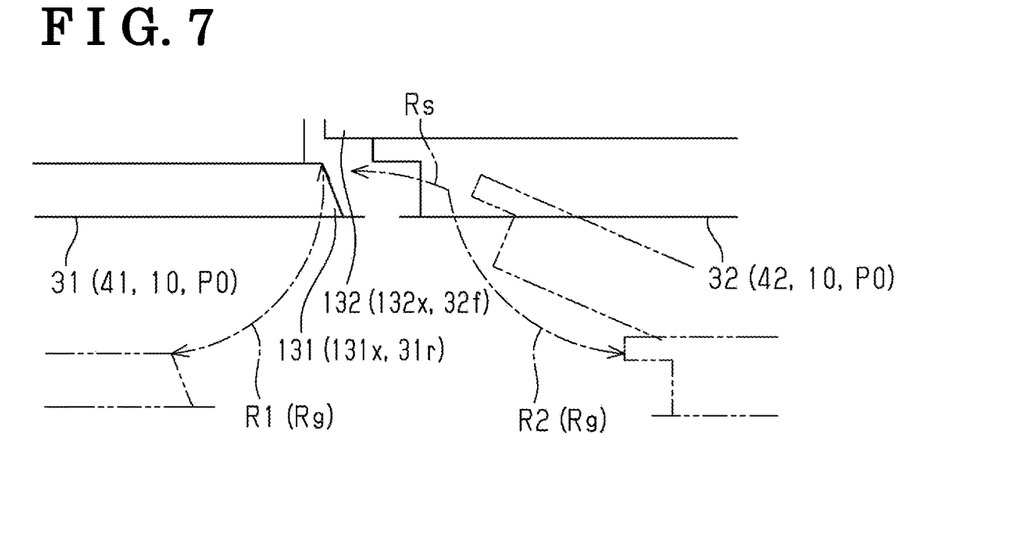
FIG. 7 is a diagram illustrating opening and closing trajectories of the front door and the rear door in the vicinity of a fully closed position.

As shown in FIG. 7, in the vehicle door device 30 according to the present embodiment, the opening and closing trajectory R2 of the rear door 32 changes based on the operation of the coupling length variable mechanism 100 provided in the second link arm 82 on the second link mechanism 52 side. Specifically, when the rear door 32 is in the vicinity of the fully closed position P0, the opening and closing trajectory R2 of the rear door 32 changes to a linear trajectory Rs. Accordingly, the vehicle door device 30 according to the present embodiment is configured such that the front door 31 and the rear door 32, which are independently opened and closed, do not interfere with each other based on the operations of the first and second link mechanisms 51, 52.

That is, in the vehicle 1 according to the present embodiment, the front door 31 is closed toward the rear side of the vehicle using a rear end portion 31r of the front door 31 as a closing end portion 131. In addition, the rear door 32 is closed toward the front side of the vehicle using a front end portion 32f of the rear door 32 as a closing end portion 132. Further, the front door 31 and the rear door 32 are disposed at the fully closed positions P0 respectively in a state in which closing end portion tip ends 131x, 132x overlap each other in the vehicle width direction. The vehicle door device 30 according to the present embodiment is configured such that the closing end portion tip end 132x of the rear door 32 and the closing end portion tip end 131x of the front door 31 do not interfere with each other based on the change in the opening and closing trajectory R2 in the vicinity of the fully closed position P0 as described above.

In addition, as shown in FIGS. 1 to 4, the vehicle door device 30 according to the present embodiment has a configuration as a so-called power door device capable of opening and closing the front door 31 and the rear door 32 of the vehicle 1 based on a driving force of an actuator 140.

Specifically, the vehicle door device 30 according to the present embodiment includes a first actuator 141 that applies the driving force to the first link mechanism 51 to open and close the first door 41 supported by the first link mechanism 51. The vehicle door device 30 further includes a second actuator 142 that applies the driving force to the second link mechanism 52 to open and close the second door 42 supported by the second link mechanism 52. The vehicle door device 30 according to the present embodiment is configured such that the front door 31 serving as the first door 41 and the rear door 32 serving as the second door 42 are independently opened and closed by operations of the first and second actuators 141, 142, respectively.

Specifically, the first and second actuators 141, 142 each have a motor serving as a driving source thereof. In addition, the first and second actuators 141, 142 are provided at the first pivot coupling points X1, X1 of the first link arms 71, 81, respectively, in the corresponding first and second link mechanisms 51, 52.

Specifically, the first actuator 141 is provided at a base end portion 71x of the first link arm 71 having the first pivot coupling point X1 with respect to the vehicle body 2 in a state in which the first actuator 141 is fixed to the vehicle body 2. Specifically, the first actuator 141 is provided at a position where the base end portion 71x of the first link arm 71 and a coupling bracket 143 that allows the base end portion 71x to pivot with respect to the vehicle body 2 are coupled. Accordingly, the first actuator 141 applies a driving force for pivoting the first link arm 71 on the first link mechanism 51 side around the first pivot coupling point X1 with respect to the vehicle body 2.

Similarly, the second actuator 142 is provided at a base end portion 81x of the first link arm 81 having the first pivot coupling point X1 with respect to the vehicle body 2 in a state in which the second actuator 142 is fixed to the vehicle body 2. Specifically, the second actuator 142 is provided at a position where the base end portion 81x of the first link arm 81 and a coupling bracket 144 that allows the base end portion 81x to pivot with respect to the vehicle body 2 are coupled. Accordingly, the second actuator 142 applies a driving force for pivoting the first link arm 81 on the second link mechanism 52 side around the first pivot coupling point X1 with respect to the vehicle body 2.

Further, in the vehicle door device 30 according to the present embodiment, independent control signals are input to the first and second actuators 141, 142, respectively. Accordingly, in the vehicle 1 according to the present embodiment, the front door 31 supported by the first link mechanism 51 and the rear door 32 serving as the second door 42 supported by the second link mechanism 52 are opened and closed independently of each other.

Front Door Biasing Structure

Next, a biasing structure of the front door 31 mounted on the vehicle door device 30 according to the present embodiment will be described. Hereinafter, for convenience of description, a direction in which the front end portion 31f and the rear end portion 31r of the front door 31 are coupled, that is, a front-rear direction of the front door 31 when the front door 31 of the vehicle 1 is in a fully closed state is referred to as a "door length direction".

As shown in FIGS. 1 to 4 and 8, in the vehicle door device 30 according to the present embodiment, the first link arm 71 has the second pivot coupling point X2 with respect to the front door 31 on a rear end portion 31r side (a left side in FIG. 8) of the front door 31 in the door length direction with respect to the center position. That is, the second pivot coupling point X2 with respect to the front door 31 of the first link arm 71 forming the first link mechanism 51 is set at a position closer to the closing end portion 131 of the front door 31. By adopting such a configuration, during opening operation of the front door 31, the front door 31 that moves to the front side of the vehicle based on the operation of the first link mechanism 51 can be disposed at the front side of the vehicle, that is, in an opening operation direction. Accordingly, in the vehicle door device 30 according to the present embodiment, a larger door opening amount is secured for the door opening portion 3 of the vehicle 1 in which the front door 31 is provided.

Figure 8:
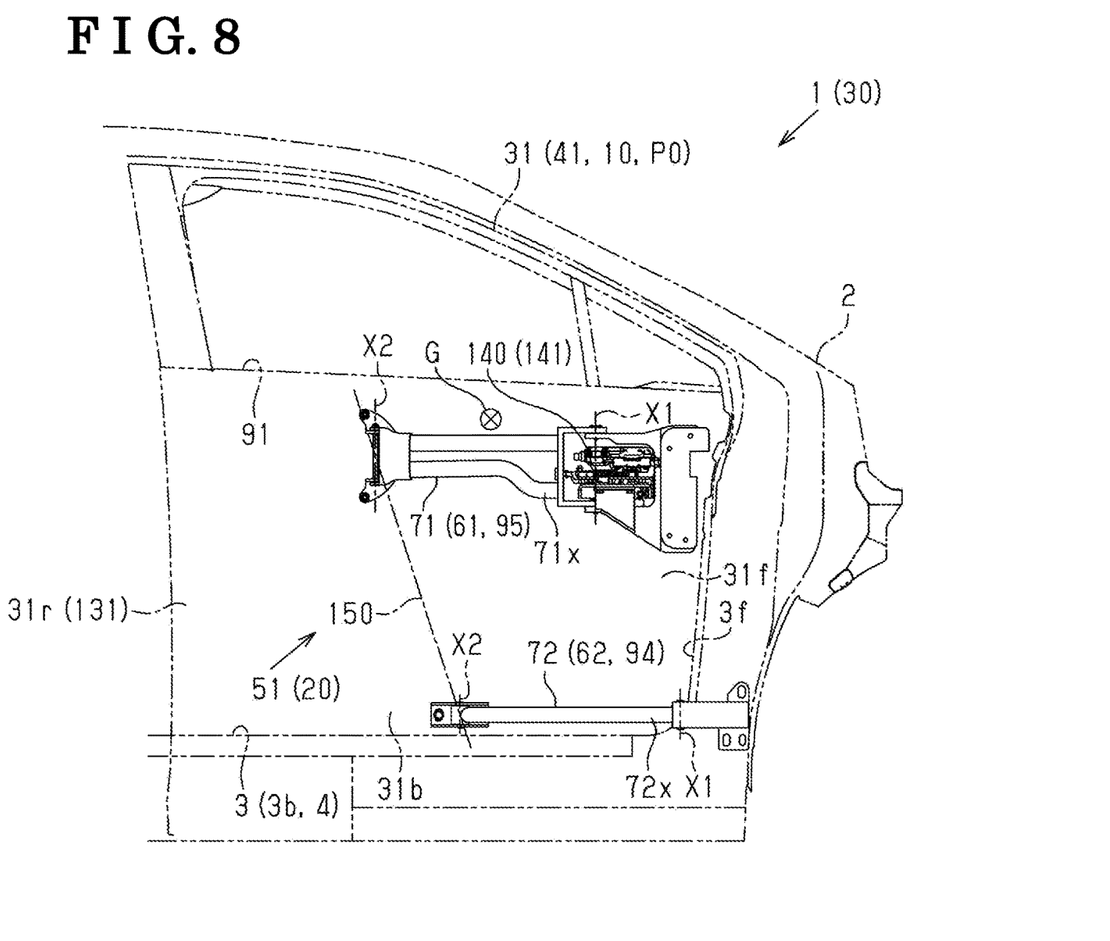
FIG. 8 is a side view of a link mechanism that supports the front door of the vehicle.

In addition, as shown in FIG. 8, in the vehicle 1 according to the present embodiment, the front door 31 has a gravity center G at a substantially central position between the front end portion 31f and the rear end portion 31r and at a height in the vicinity of a belt line below the window portion 91. In the vehicle door device 30 according to the present embodiment, the second pivot coupling point X2 of the first link arm 71 with respect to the front door 31 is set at a position on the rear end portion 31r side with respect to the gravity center G in the door length direction of the front door 31.

That is, in the vehicle door device 30 according to the present embodiment, the front door 31 is formed with a virtual support axis 150 extending in a direction in which the second pivot coupling points X2, X2 of the first and second link arms 71, 72 forming the first link mechanism 51 with respect to the front door 31 are coupled. In the vehicle door device 30 according to the present embodiment, the gravity center G of the front door 31 is positioned at a front end portion 31f side (a right side in FIG. 8) with respect to a position in the door length direction where the support axis 150 of the front door 31 formed by the first link mechanism 51 is formed.

Figure 9:
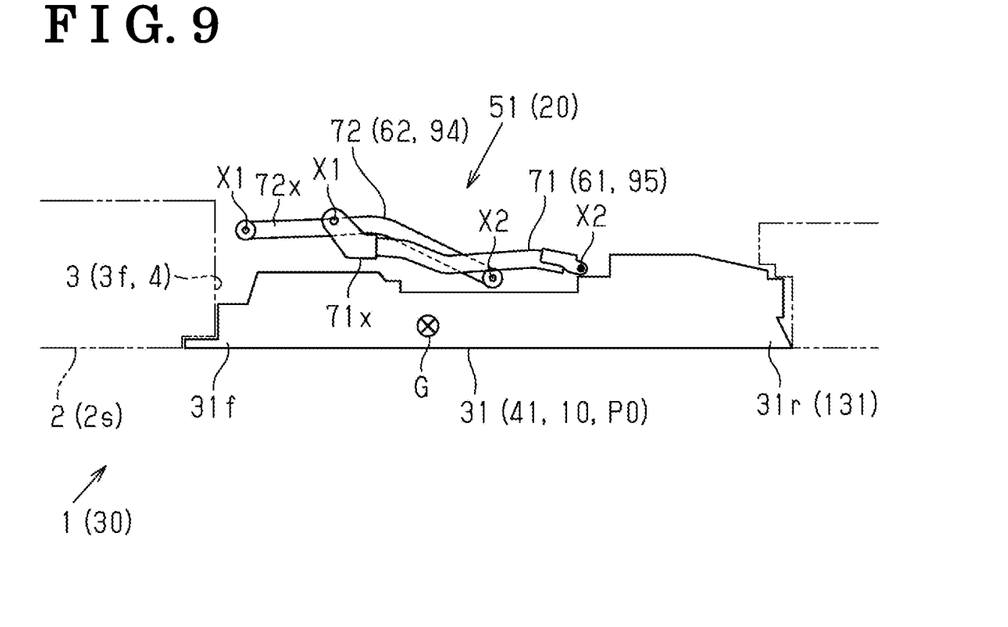
FIG. 9 is a plan view of the front door supported by the door opening portion via a first link mechanism.
Figure 10:
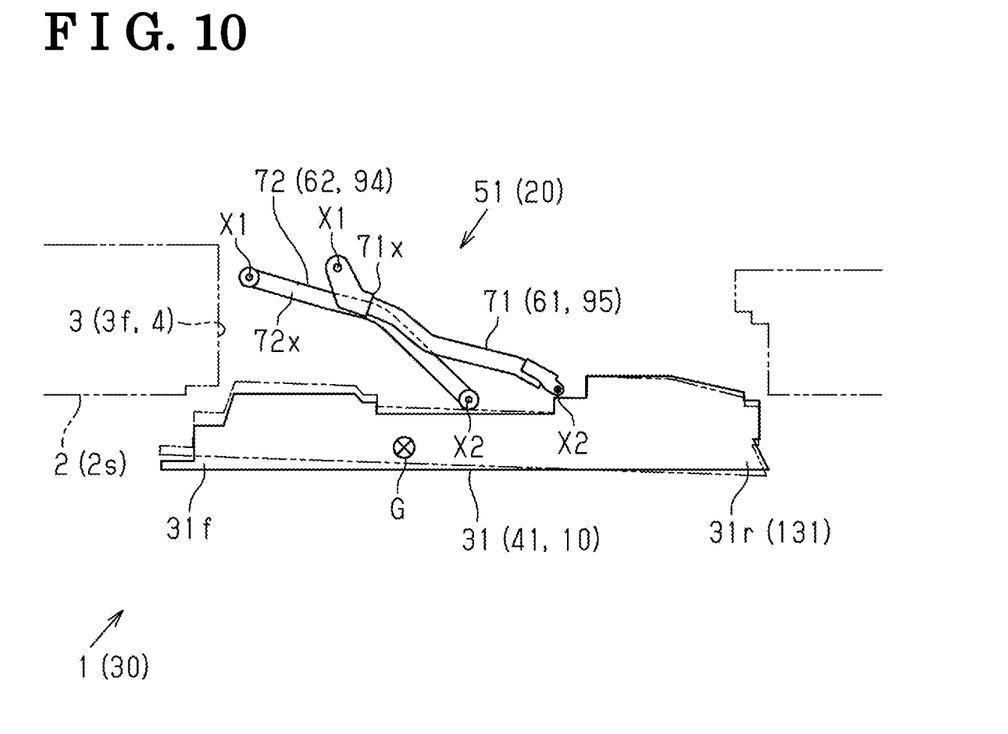
FIG. 10 is a diagram illustrating a rotational moment based on inertia generated in the front door accompanied by an operation of the first link mechanism.

However, as shown in FIGS. 8 to 10, by setting the second pivot coupling point X2 at a position deviated from the gravity center G, when the door 10 is opened and closed accompanied by the operation of the link mechanism 20, a rotational moment around the second pivot coupling point X2 is generated by inertia of the door 10. For the convenience of description, in FIG. 9 and each drawing subsequent to FIG. 9, the position of the gravity center G in the door length direction is illustrated regardless of a height position of the front door 31 illustrated in the drawing.

For example, in the vehicle door device 30 according to the present embodiment, the front door 31 supported by the first link mechanism 51 is opened from the fully closed position P0 based on the driving force of the first actuator 141. At this time, the first and second link arms 71, 72 forming the first link mechanism 51 pivot around the first pivot coupling points X1, X1 with respect to the vehicle body 2, respectively. Accordingly, the second pivot coupling points X2, X2 with respect to the front door 31 move outward (downward in FIGS. 9 and 10) in the vehicle width direction.

At this time, a force for keeping the front door 31 in place acts due to the inertia of the front door 31. Therefore, the start of movement of the substantially central position in the door length direction having the gravity center G, that is, the start of movement of the front end portion 31f side is delayed with respect to the position on the rear end portion 31r side where the second pivot coupling points X2 and X2 between the first and second link arms 71, 72 and the front door 31 are set. Accordingly, there is a problem that the rotational moment around the second pivot coupling point X2 is generated in such a manner that the front door 31 apparently swings around the gravity center G.

Figure 11:
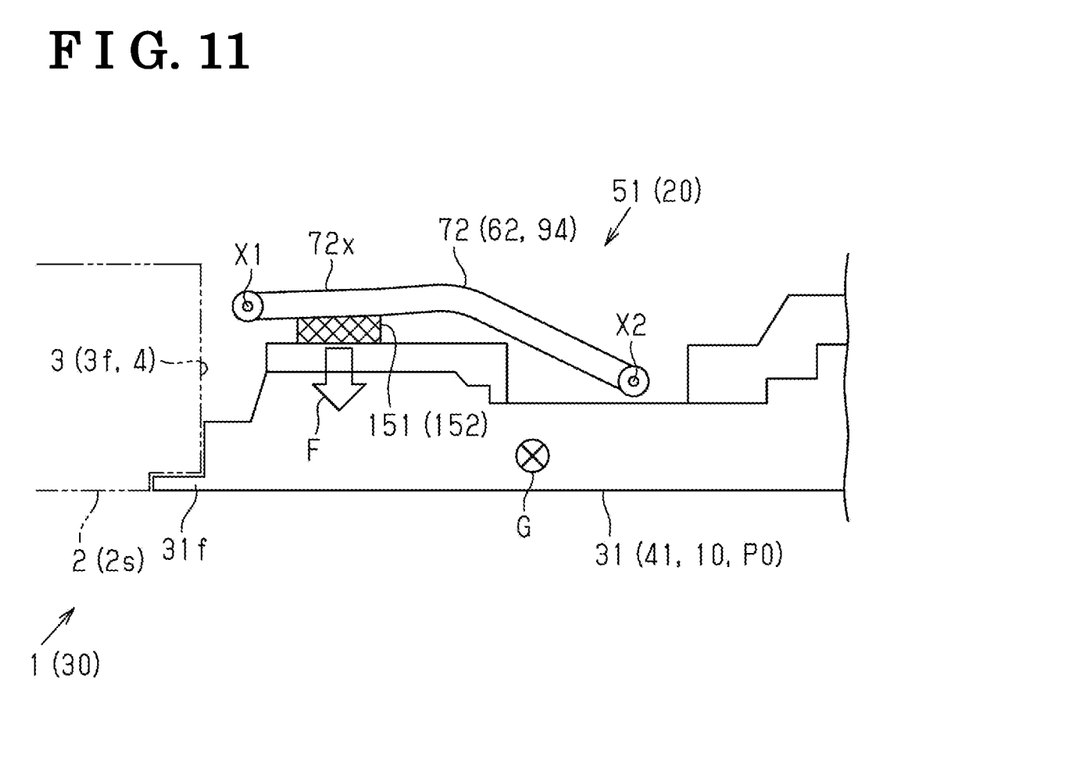
FIG. 11 is a schematic configuration diagram of a biasing force applying device provided in a vehicle door device.

In view of this point, as shown in FIG. 11, the vehicle door device 30 according to the present embodiment includes a biasing force applying device 151 that applies, to the front door 31 in such a case, a biasing force F in a direction in which the rotational moment around the second pivot coupling point X2 generated based on the inertia of the front door 31 is reduced. The phrase "rotational moment around the second pivot coupling point X2" can also be rephrased as a phrase "rotational moment around the support axis" based on the fact that the virtual support axis 150 is formed by the second pivot coupling points X2, X2 with respect to the front door 31 as described above. Accordingly, the vehicle door device 30 according to the present embodiment improves the texture of the front door 31 by restricting the swing of the front door 31 caused by the rotational moment generated around the second pivot coupling point X2.

Specifically, the vehicle door device 30 according to the present embodiment includes an elastic member 152 that is interposed between the front door 31 and the first link mechanism 51 by the front door 31 moving to the fully closed position P0. In the vehicle door device 30 according to the present embodiment, the elastic member 152 is formed of, for example, an elastic material such as rubber or elastomer. In addition, when the front door 31 is fully closed, the elastic member 152 is interposed between the front door 31 and the second link arm 72 having a configuration as a sub-link 94. That is, in the vehicle door device 30 according to the present embodiment, the elastic member 152 interposed between the front door 31 and the second link arm 72 is elastically deformed by the front door 31 moving to the fully closed position P0. When the front door 31 is opened from the fully closed position P0 based on the driving force of the first actuator 141, the biasing force applying device 151 according to the present embodiment biases the front end portion 31f side of the front door 31 outward in the vehicle width direction based on an elastic force of the elastic member 152.

Specifically, in the vehicle door device 30 according to the present embodiment, the elastic member 152 constituting the biasing force applying device 151 is fixed to the second link arm 72 in the vicinity of a base end portion 72x of the second link arm 72. That is, the elastic member 152 is provided separately from a weather strip (not shown) as a seal member attached to each door 10. Further, the elastic member 152 is interposed between the second link mechanism 72 and the front door 31 moved to the fully closed position P0, thereby pressing the front end portion 31f side of the front door 31 outward in the vehicle width direction based on the elastic force. Accordingly, when the front door 31 is opened from the fully closed position P0 accompanied by the operation of the first link mechanism 51, the biasing force applying device 151 according to the present embodiment biases a gravity center G side in the opening operation direction with respect to the second pivot coupling point X2 whose start of movement is delayed due to the inertia of the front door 31.

Next, an operation of the present embodiment will be described.

That is, by biasing the front end portion 31f side of the front door 31, which is on the gravity center G side with respect to the second pivot coupling point X2, outward in the vehicle width direction, the start of movement of the front end portion 31f side is accelerated. Accordingly, the rotational moment around the second pivot coupling point X2 generated based on the inertia generated in the front door 31 accompanied by the operation of the first link mechanism 51 is reduced.

Next, effects of the present embodiment will be described.

(1) That is, it is possible to restrict the swing of the front door 31 supported by the first link mechanism 51 by reducing the rotational moment around the second pivot coupling point X2 generated based on the inertia of the front door 31. Accordingly, a high texture including feeling can be ensured.

Further, by restricting the swing of the front door 31, the front door 31 is less likely to interfere with the front edge portion 3f of the door opening portion 3 in the vicinity of the fully closed position P0. Accordingly, a gap set between the front door 31 and the front edge portion 3f of the door opening portion 3 can be narrowed to ensure high design.

(2) The vehicle door device 30 includes the first actuator 141 that applies the driving force to the first link arm 71 constituting the first link mechanism 51 to open and close the front door 31.

According to the above configuration, it is possible to improve convenience of an occupant who gets on and off the vehicle 1 via the front opening portion 4 of the door opening portion 3 in which the front door 31 is provided. In addition, in the configuration in which the driving force is applied to the first link mechanism 51, the first link mechanism 51 operates before the front door 31. Accordingly, the rotational moment around the second pivot coupling point X2 generated based on the inertia of the front door 31 is generated. However, even in such a configuration, it is possible to reduce, by providing the biasing force applying device 151, the rotational moment around the second pivot coupling point X2 generated based on the inertia generated in the front door 31. Accordingly, it is possible to more effectively restrict the swing of the front door 31 supported by the first link mechanism 51.

(3) The biasing force applying device 151 applies the biasing force F to the position at the gravity center G side of the front door 31 with respect to the second pivot coupling point X2.

That is, when the front door 31 moves based on the operation of the first link mechanism 51, an inertial force acts on the front door 31. Accordingly, the start of movement of the front door 31 at the gravity center G side with respect to the second pivot coupling point X2 is delayed, and thus the rotational moment around the second pivot coupling point X2 is generated in the front door 31. Therefore, according to the above configuration, it is possible to efficiently apply, to the front door 31, the biasing force F in the direction in which the rotational moment around the second pivot coupling point X2 generated based on the inertia is reduced. Accordingly, it is possible to effectively restrict the swing of the front door 31 supported by the first link mechanism 51.

(4) In particular, the front door 31 supported by the first link mechanism 51 formed by the first and second link arms 71, 72 is opened in a moving direction of the occupant who gets on and off the vehicle 1 via the front opening portion 4 of the door opening portion 3 in which the front door 31 is provided, that is, opened toward the front side of the vehicle. Therefore, in order to secure a larger door opening amount, the second pivot coupling point X2 with respect to the front door 31 is often set at a position on the rear end portion 31r side of the front door 31. As a result, the second pivot coupling point X2 is likely to be separated from the gravity center G of the front door 31. Accordingly, there is a tendency that the rotational moment around the second pivot coupling point X2 generated based on the inertia of the front door 31 is easily generated. Therefore, a more remarkable effect can be achieved in such a manner of providing the biasing force applying device 151 for the front door 31 to be opened toward the front side of the vehicle.

(5) When the front door 31 is opened from the fully closed position P0, the biasing force applying device 151 is configured to apply the biasing force F in the direction in which the rotational moment around the second pivot coupling point X2 generated based on inertia of the front door 31 is reduced.

That is, since the front door 31 moves from a stop state when the front door 31 is opened from the fully closed position P0, the rotational moment around the second pivot coupling point X2 generated based on the inertia of the front door 31 is likely to be generated. In addition, there is also a tendency that the resulting swing of the front door 31 is likely to be obvious. Therefore, according to the above configuration, a more remarkable effect can be achieved.

(6) The biasing force applying device 151 applies the biasing force F to the front door 31 based on the elastic force of the elastic member 152 that is elastically deformed accompanied by the operation of the first link mechanism 51 supporting the front door 31.

According to the above configuration, it is possible to apply, with a simple configuration, the biasing force F in the direction in which the rotational moment around the second pivot coupling point X2 generated based on the inertia generated in the front door 31 accompanied by the operation of the first link mechanism 51 is reduced.

(7) Further, the elastic member 152 is disposed at a position where the elastic member 152 is interposed, by the front door 31 moving to the fully closed position P0, between the front door 31 and the second link arm 72 constituting the first link mechanism 51.

By adopting such a configuration, when the front door 31 is opened from the fully closed position P0, a position of the front door 31 at the gravity center G side with respect to the second pivot coupling point X2 can be pressed in the opening operation direction based on the elastic force of the elastic member 152 interposed between the front door 31 and the first link mechanism 51. Accordingly, it is possible to effectively reduce the rotational moment around the second pivot coupling point X2 based on the inertia of the front door 31.

The above embodiment may be modified and implemented as follows. The above embodiment and the following modifications can be performed in combination with each other within a technically consistent range.

In the above embodiment, the elastic member 152 constituting the biasing force applying device 151 is fixed to the second link arm 72. Further, the elastic member 152 is interposed between the front door 31 and the second link arm 72 having a configuration as the sub-link 94 by the front door 31 moving to the fully closed position P0. When the front door 31 is opened from the fully closed position P0, the biasing force applying device 151 biases the front end portion 31f side of the front door 31 outward in the vehicle width direction based on the elastic force of the elastic member 152.

However, this disclosure is not limited thereto, and the elastic member 152 fixed to the front door 31 may be interposed between the front door 31 and the second link arm 72 by the movement to the fully closed position P0.

Figure 12:
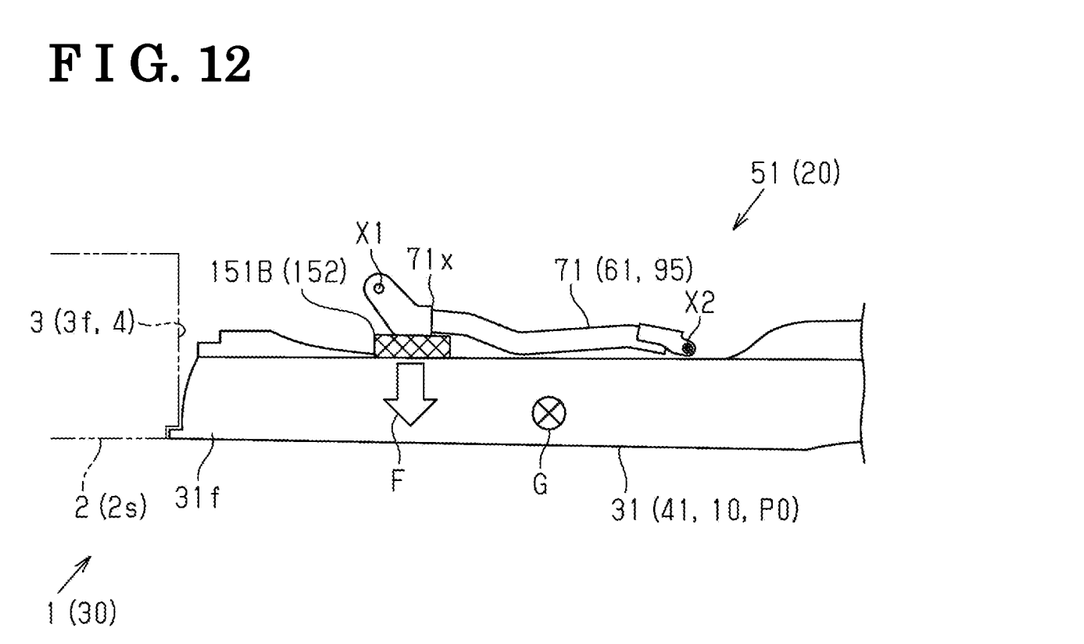
FIG. 12 is a schematic configuration diagram of another example of the biasing force applying device provided in the vehicle door device.

In addition, as a biasing force applying device 151B shown in FIG. 12, the elastic member 152 may be interposed between the front door 31 and the first link arm 71 having a configuration as the main link 95. In this case, in addition, the elastic member 152 may be fixed to the first link arm 71 side, or may be fixed to the front door 31 side.

With such a configuration, when the front door 31 is opened from the fully closed position P0, the front end portion 31*f* side of the front door 31 can also be biased outward in the vehicle width direction based on the elastic force of the elastic member 152 interposed between the front door 31 and the first link mechanism 51. That is, the position of the front door 31 at the gravity center G side with respect to the second pivot coupling point X2 can be biased outward in the vehicle width direction. Accordingly, it is possible to effectively reduce the rotational moment around the second pivot coupling point X2 based on the inertia of the front door 31.

That is, when the biasing force F is applied to the front door 31 using the elastic force of the elastic member 152, the elastic member 152 may be interposed between the front door 31 and the first link mechanism 51. Further, in this case, the elastic member 152 may be interposed between the front door 31 and the first link arm 71, or may be interposed between the front door 31 and the second link arm 72. The elastic member 152 may be interposed between the front door 31 and each of the first and second link arms 71, 72.

Figure 13:
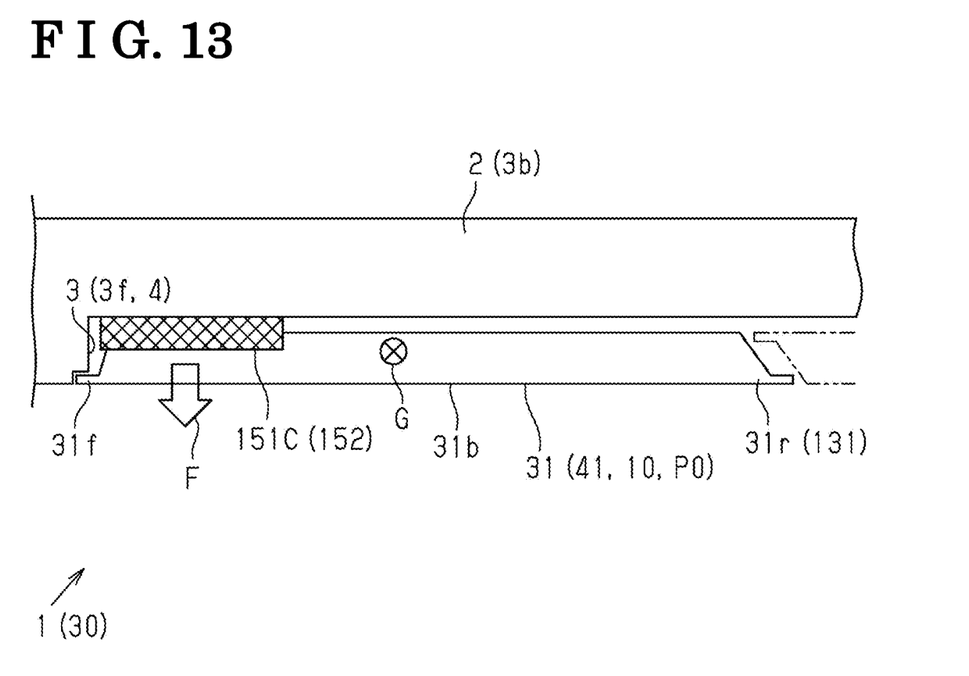
FIG. 13 is a schematic configuration diagram of still another example of the biasing force applying device provided in the vehicle door device.

In addition, as a biasing force applying device 151C shown in FIG. 13, the elastic member 152 may be interposed between the front door 31 and the vehicle body 2. With such a configuration, similarly to the above embodiment, it is also possible to effectively reduce the rotational moment around the second pivot coupling point X2 generated based on the inertia.

Specifically, in the biasing force applying device 151C, the elastic member 152 is provided at a position where the elastic member 152 is interposed, by the front door 31 moving to the fully closed position P0, between the front door 31 and a lower edge portion 3*b* of the door opening portion 3. Accordingly, when the front door 31 is opened from the fully closed position P0, the front end portion 31*f* side of the front door 31 is biased outward in the vehicle width direction based on the elastic force of the elastic member 152 interposed between the front door 31 and the lower edge portion 3*b* of the door opening portion 3.

In this case, in addition, the elastic member 152 may be fixed to the front door 31 side or a vehicle body 2 side. In addition, a position and the number of the elastic member 152 interposed between the front door 31 and the vehicle body 2 may be freely changed. This structure may be implemented in combination with the configuration described above in which the elastic member 152 is interposed between the front door 31 and the first link mechanism 51.

The elastic force of the elastic member 152 may be freely changed in accordance with a magnitude of the biasing force F applied to the front door 31, which is required to reduce the rotational moment around the second pivot coupling point X2 generated based on the inertia of the front door 31. Further, when the front door 31 is opened from the fully closed position P0, the first link mechanism 51 may press the front door 31 via the elastic member 152 interposed between the front door 31 and the first link mechanism 51. At least one of the base end portions 71*x*, 72*x* of the first and second link arms 71, 72 constituting the first link mechanism 51 may be provided with a pressing member that presses the front end portion 31*f* of the front door 31 outward in the vehicle width direction when the front door 31 is opened from the fully closed position P0.

A shape and material of the elastic members 152 may be freely changed. For example, the biasing force F may be applied to the front door 31 using a compression spring, a tension spring, a torsion coil spring, or the like. As long as the biasing force F in the direction in which the biasing force F is applied to the front door 31 can be generated based on the elastic force of the elastic member 152 elastically deformed accompanied by the operation of the first link mechanism 51, the elastic member 152 does not necessarily to be interposed by the front door 31.

In addition, as long as it is possible to apply the biasing force F in the direction in which the rotational moment around the second pivot coupling point X2 generated based on the inertia generated in the front door 31 accompanied by the operation of the first link mechanism 51, an application position of the biasing force F may also be freely changed. For example, during opening operation of the front door 31, the biasing force applying device 151 presses the rear end portion 31*r* side of the front door 31 inward in the vehicle width direction. That is, the biasing force F may be applied in a manner of pressing a position at a side opposite to the gravity center G with the second pivot coupling point X2 being interposed. With such a configuration, the same effects as those of the above embodiment can be achieved.

Further, the biasing force applying device 151 does not necessarily have a configuration in which the biasing force F is applied to the front door 31 based on the elastic force of the elastic member 152. For example, the biasing force applying device 151 may have a configuration in which a motor, a solenoid, or the like is used as a driving source to apply, to the front door 31, the biasing force F in the direction in which the rotational moment around the second pivot coupling point X2 generated based on inertia is reduced.

In the above embodiment, when the front door 31 is opened from the fully closed position P0, the biasing force applying device 151 applies, to the front door 31, the biasing force F in the direction in which the rotational moment around the second pivot coupling point X2 generated based on the inertia is reduced. However, this disclosure is not limited thereto, and when the front door 31 is closed from a fully opened position P1, the biasing force applying device 151 may apply, to the front door 31, the biasing force F in the direction in which the rotational moment around the second pivot coupling point X2 generated based on inertia is reduced. When the front door 31 is stopped at an intermediate position of an opening and closing operation or is reversed, the biasing force applying device 151 may apply the above biasing force F to the front door 31 to be opened and closed accompanied by the operation of the first link mechanism 51.

In the above embodiment, the first actuator 141 applies the driving force to the first link arm 71 having the configuration as the main link 95, thereby opening and closing the front door 31 supported by the first link mechanism 51. However, this disclosure is not limited thereto, and this disclosure may be applied to a configuration including the actuator 140 that opens and closes the front door 31 by applying the driving force to the second link arm 72 having the configuration as the sub-link 94.

In the above embodiment, this disclosure is embodied as a configuration in which the biasing force applying device 151 is provided for the front door 31 to be opened toward the front side of the vehicle based on the operation of the first link mechanism 51 formed by the first and second link arms 71, 72. However, this disclosure is not limited thereto, and the biasing force applying device 151 may be provided for the rear door 32 to be opened toward the front side of the vehicle based on the operation of the second link mechanism 52 formed by the first and second link arms 81, 82.

That is, the door 10 of the vehicle 1 is opened and closed based on the operation of the link mechanism 20 formed by the first and second link arms 61, 62. Further, accompanied by the operation of the link mechanism 20, the rotational moment around the second pivot coupling point X2 generated based on inertia of the door 10 of the vehicle 1 is generated in the door 10 of the vehicle 1 supported by the link mechanism 20. The biasing force applying device 151 capable of applying, to the door 10, the biasing force F in the direction in which the rotational moment around the second pivot coupling point X2 is reduced may be provided.

In addition, this disclosure may be applied to a configuration in which the door 10 supported by the link mechanism 20 is manually opened and closed.

Next, technical ideas that can be understood from the above embodiment and modification will be described.

(A) When the door is opened from the fully closed position, the link mechanism presses the door via the elastic member interposed by the door. Accordingly, it is possible to more effectively apply, to the door, the biasing force in the direction in which the rotational moment around the support axis generated based on the inertia of the door is reduced.

(B) The elastic member is separated from the seal member provided in the door.

According to an aspect of this disclosure, a vehicle door device includes: a first link arm and a second link arm each having a first pivot coupling point with respect to a vehicle body and a second pivot coupling point with respect to a door of a vehicle; and a biasing force applying device configured to, during opening and closing operation of the door based on an operation of a link mechanism formed by the first link arm and the second link arm, apply, to the door, a biasing force in a direction in which a rotational moment around the second pivot coupling point generated based on inertia of the door generated in the door accompanied by the operation of the link mechanism is restricted.

That is, when the door moves based on the operation of the link mechanism, an inertial force acts on the door. Accordingly, the start of movement of the door at a gravity center side with respect to the second pivot coupling point is delayed, and thus the rotational moment around the second pivot coupling point is generated in the door. However, according to the above configuration, it is possible to reduce the rotational moment around the second pivot coupling point generated based on the inertia generated in the door accompanied by the operation of such a link mechanism. Accordingly, it is possible to effectively restrict swing of the door supported by the link mechanism.

The vehicle door device according to the above aspect may include an actuator configured to apply a driving force to the link mechanism to open and close the door.

According to the above configuration, it is possible to improve convenience of an occupant who gets on and off the vehicle via a door opening portion in which the door is provided. In addition, in the configuration in which the driving force is applied to the link mechanism, the link mechanism operates before the door. Accordingly, the rotational moment around the second pivot coupling point generated based on the inertia of the door is generated. However, even in such a configuration, it is possible to reduce, by providing the biasing force applying device, the rotational moment around the second pivot coupling point generated based on the inertia generated in the door. Accordingly, it is possible to more effectively restrict the swing of the door supported by the link mechanism.

In the vehicle door device according to the above aspect, the biasing force applying device may apply the biasing force to a position at a gravity center side of the door with respect to the second pivot coupling point.

According to the above configuration, it is possible to efficiently apply, to the door supported by the link mechanism, the biasing force in the direction in which the rotational moment around the second pivot coupling point generated based on the inertia of the door is reduced.

In the vehicle door device according to the above aspect, the door may be a front door of the vehicle.

That is, the front door supported by the link mechanism formed by the first and second link arms is opened in a moving direction of the occupant who gets on and off the vehicle via the door opening portion in which the front door is provided, that is, opened toward a front side of the vehicle. Therefore, in order to secure a larger door opening amount, the second pivot coupling point with respect to the front door is often set at a position on a rear end portion side of the door. That is, the second pivot coupling point with respect to the front door is likely to be separated from a gravity center of the front door. Accordingly, there is a tendency that the rotational moment around the second pivot coupling point generated based on the inertia of the door is easily generated. Therefore, a more remarkable effect can be achieved in such a manner of providing the biasing force applying device for the front door to be opened toward the front side of the vehicle.

In the vehicle door device according to the above aspect, the biasing force applying device may apply the biasing force when the door is opened from a fully closed position.

That is, since the door moves from a stop state when the door is opened from the fully closed position, the rotational moment around the second pivot coupling point generated based on the inertia of the door is likely to be generated. In addition, there is also a tendency that the resulting swing of the door is likely to be obvious. Therefore, according to the above configuration, a more remarkable effect can be achieved.

In the vehicle door device according to the above aspect, the biasing force applying device may apply the biasing force based on an elastic force of an elastic member that is elastically deformed accompanied by the operation of the link mechanism.

According to the above configuration, it is possible to apply, with a simple configuration, the biasing force in the direction in which the rotational moment around the second pivot coupling point generated based on the inertia generated in the door accompanied by the operation of the link mechanism is reduced.

In the vehicle door device according to the above aspect, the biasing force applying device may include the elastic member configured to be interposed between the door and the link mechanism by the door moving to the fully closed position.

According to the above configuration, when the door is opened from the fully closed position, a position of the door at the gravity center side with respect to the second pivot coupling point can be pressed in an opening operation direction based on the elastic force of the elastic member interposed between the door and the link mechanism. Accordingly, it is possible to effectively reduce the rotational moment around the second pivot coupling point based on the inertia of the door.

The vehicle door device according to the above aspect may include the elastic member configured to be interposed between the door and the vehicle body by the door moving to the fully closed position.

According to the above configuration, it is possible to stably apply, when the door is opened from the fully closed position, the biasing force to the door based on the elastic force of the elastic member interposed between the door and the link mechanism.

According to this disclosure, the swing of the door supported by the link mechanism can be restricted.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door device comprising:
    a first link arm and a second link arm each having a first pivot coupling point with respect to a vehicle body and a second pivot coupling point with respect to a door of a vehicle; and
    a biasing force applying device configured to, during opening and closing operation of the door based on an operation of a link mechanism formed by the first link arm and the second link arm, apply, to the door, a biasing force in a direction in which a rotational moment around the second pivot coupling point generated based on inertia of the door generated in the door accompanied by the operation of the link mechanism is reduced,
    wherein the biasing force applying device applies the biasing force based on an elastic force of an elastic member attached to one of the door and the first link arm that is elastically deformed by the operation of the link mechanism when the elastic member contacts the other of the door and the first link arm.

2. The vehicle door device according to claim 1 further comprising:
    an actuator configured to apply a driving force to the link mechanism to open and close the door.

3. The vehicle door device according to claim 1, wherein the biasing force applying device applies the biasing force to a position at a gravity center side of the door with respect to the second pivot coupling point.

4. The vehicle door device according to claim 1, wherein the door is a front door of the vehicle.

5. The vehicle door device according to claim 1, wherein the biasing force applying device applies the biasing force when the door is opened from a fully closed position.

6. The vehicle door device according to claim 1, wherein the biasing force applying device includes the elastic member configured to be interposed between the door and the link mechanism by the door moving to a fully closed position.

7. The vehicle door device according to claim 1, wherein the biasing force applying device includes the elastic member configured to be interposed between the door and the vehicle body by the door moving to a fully closed position.

8. The vehicle door device according to claim 1, wherein the elastic member is formed of rubber or elastomer.

9. The vehicle door device according to claim 1, wherein the elastic member is attached to the door and is deformed by contact with the first link arm.

10. The vehicle door device according to claim 1, wherein the elastic member is attached to the first link arm and is deformed by contact with the door.

* * * * *